3,129,177
NEW PROCESS FOR PREPARING SILICEOUS
AMINO COMPOUNDS
Frederick J. Ihde, Jr., Mountain Lakes, and Siegfried Altscher, Union, N.J., assignors to Nopco Chemical Company, Newark, N.J., a corporation of New Jersey
No Drawing. Filed Sept. 18, 1961, Ser. No. 138,566
14 Claims. (Cl. 252—21)

This invention relates to a process for preparing siliceous amino compounds. More particularly, this invention relates to a process for preparing siliceous amino compounds, using an unique mixture of partial amides.

U.S. Patent No. 2,967,828, Ihde, issued January 1961, discloses and claims certain siliceous amino compounds. These materials are prepared by reacting, in an aqueous medium, partial amide salts with water soluble silicate salts in which said silicate salts are present in an amount sufficient to react with all of the acidic components of the partial amide salt. If the silicate salt is present in greater than the aforementioned amount, said amount hereafter being referred to as a stoichiometric amount, then after reaction between the partial amide salt and the silicate salt, the excess silicate salt can be converted to silicon dioxide by treatment with an acid, and the siliceous amino compound is then adsorbed or complexed upon the surface of the silicon dioxide. This silicon dioxide is referred to as free or uncombined silica or colloidal silica. The disclosure in U.S. Patent No. 2,967,828, is hereby incorporated into the present application by reference.

Patent application Serial No. 836,086, filed August 26, 1959, and now pending, describes and claims an improved process for preparing siliceous amino compounds. This process uses substantially water insoluble organic liquids and is particularly advantageous because it overcomes excessively slow filtration rates, increased aggregate formation, and shrinkage of the filter cake during drying, all of which were previously encountered in preparing these siliceous amino compounds. The disclosures contained in this latter mentioned copending application are hereby incorporated into the present case by reference.

Patent application Serial No. 86,323, filed February 1, 1961, Ihde et al., and now pending, describes and claims a still improved process for preparing siliceous amino compounds wherein fluosilicic acid or a water soluble inorganic fluosilicate salt is used. The use of these fluosilicates or fluosilicic acid enables one to prepare siliceous amino compounds in an improved manner when compared with the disclosure in U.S. Patent No. 2,967,828 and copending patent application, Serial No. 836,086. In addition, the use of fluosilicic acid or/and the fluosilicates resulted in the preparation of siliceous amino compounds of finer particle size and greater oil thickening power than was possible in U.S. Patent 2,967,828. The use of fluosilicic acid or/and the fluosilicates also overcame the problems of solvent loss encountered in patent application Serial No. 836,086, when a volatile organic liquid was used. In addition, where a non-volatile, substantially water insoluble organic liquid was used it was difficult to separate the organic liquid from the siliceous amino compound where desired, as for example in the fields of gas purification, recovery or removal of organic materials from aqueous systems, and the like. U.S. patent application Serial No. 86,323, solved this last mentioned problem. The disclosure contained in patent application Serial No. 86,323, filed February 1, 1961, is hereby incorporated by reference in the present application.

It has been found that while the use of fluosilicic acid or/and the fluosilicates was entirely satisfactory and an advancement in the art, still greases prepared using a siliceous amino compound prepared via a process wherein a fluosilicate or/and fluosilicic acid was used suffered from one disadvantage. The disadvantage encountered was that the grease had a tendency to bleed somewhat upon standing. While the amount of bleeding was not excessive, it was realized that reduction of this tendency to bleed would improve a grease which was prepared using a siliceous amino compound described in the previously referred to U.S. patent and patent applications. In addition, the siliceous amino compounds previously prepared, while possessing fine oil thickening properties, did not possess as fine oil thickening properties as was believed possible.

Aromatic compounds, that is, isophthalic acid, terephthalic acid, and water soluble salts thereof, described in copending patent application Serial No. 107,320, filed May 3, 1961, Ihde, produced a very good product. In the last mentioned copending patent application, isophthalic acid, terephthalic acid or the water soluble salts thereof was used in the preparation of the siliceous amino compound. The aromatic acid could, if desired, be present in the final product, or the siliceous amino compound could be devoid of any aromatic acid. The disclosure contained in this last referred to patent application is hereby incorporated in the present case by reference.

Patent application Serial No. 121,350, filed July 3, 1961, Ihde and Levy, described a method for preparing siliceous amino compounds whereby water which would not ordinarily be removable prior to drying said compounds, was removed before said compounds were dried. The removal of additional water prior to drying the siliceous amino compound is desirable because the amount of residual water normally present affects the siliceous amino compound in that the siliceous amino compound still tends to form aggregate particles during drying, thus yielding particles which are denser and coarser than if more water is removed, and which are difficult to grind. These denser and coarser particles affect the solvent thickening properties of the siliceous amino compound in that more siliceous amino compound is required to obtain the same thickening effect when compared with the use of finer particles. In addition, even though, a siliceous amino compound is prepared using a fluosilicate salt or an aromatic compound such as isophthalic acid and terephthalic acid or a water soluble salt thereof, some aggregate formation of the siliceous amino compound during drying still takes place. While the aggregate formation is not as pronounced as in the earlier issued patent and patent application 836,086, still we believe that reduction of the aggregate formation of the siliceous amino compound would improve the solvent thickening and grease making properties of the siliceous amino compound.

Patent application Serial No. 121,350, filed July 3, 1961, Ihde and Levy, utilized a method removing ordinarily unremovable water from siliceous amino compounds prepared using oxazoline or imidazoline salts and a water soluble silicate salt, by initially separating water from the final siliceous amino compound slurry to obtain a solid cake. This cake was then frozen, subsequently thawed, and then filtered, thus removing water prior to drying the siliceous amino compound which would not have been removed prior to drying if the freeze-thaw procedure had not been used. The disclosure contained in patent application Serial No. 121,350, filed July 3, 1961, Ihde and Levy, is hereby incorporated into the present case by reference.

Attempts to adapt this freeze-thaw procedure to siliceous amino compounds prepared using partial amide salts and water soluble silicate salts as described in the previous patent and patent applications were not successful. Even though U.S. Patent No. 2,967,828, Ihde, issued January 1961, disclosed the preparation of siliceous amino compounds using mixtures of partial amides, those mixtures were not applicable in this invention.

Moreover, even though the particle size of siliceous amino compounds, prepared using a partial amide salt and a water soluble silicate salt via the previous methods, was fine, we believed that if a siliceous amino compound having an even smaller particle size could be prepared, regardless of whether or not the freeze-thaw procedure was used, the solvent thickening and grease making properties of such a siliceous amino compound would be even further improved.

An object of this invention therefore is to reduce the moisture content of a siliceous amino compound prepared using partial amide salts and water soluble silicate salts, prior to drying said compound.

Another object of this invention is to prepare siliceous amino compounds having finer particle size then was previously possible.

Other objects and advantages will become apparent from the following more complete description and claims.

Broadly, this invention contemplates a process for preparing siliceous amino compounds by reacting (a) a mixture of partial amide salts, said mixture being the salts of (1) partial amides prepared by reacting a polyamine with a short chain aliphatic monocarboxylic acid of from 4 to 5 carbon atoms and (2) partial amides prepared by reacting a polyamine with a long chain aliphatic monocarboxylic acid of at least 12 carbon atoms with (b) at least one water soluble silicate salt selected from the class consisting of potassium silicates, ammonium silicates, and sodium silicates, and separating water from the resultant slurry.

As used in this specification and claims, the term siliceous amino compound encompasses products prepared as described in the above identified U.S. patent and patent applications, using a mixture of short chain partial amide salts and long chain partial amide salts, which contain only silica combined with a mixture of partial amide salts, products which contain both uncombined silica and silica combined with a mixture of partial amide salts, products which contain combined silica only and an aromatic compound, and products which contain combined silica, uncombined silica and an aromatic compound.

The terms filtration and filtering, as used in the specification and claims, encompass dewatering the siliceous amino compound by mechanically passing the water through the siliceous amino compound particles. Thus the terms encompass dewatering the siliceous amino compound using a Büchner funnel, a conical funnel and conical filter paper, a filter press, centrifuging, and the like. When a siliceous amino compound is filtered gravitationally using a conical funnel and conical filter paper, the filtration as quite slow and for that reason we do not prefer to filter in this manner.

The mixture of partial amides which can be used to prepare the mixture of partial amide salts is a mixture of (1) the reaction product of a polyamine with a four or five carbon acid such as butyric acid, valeric acid, crotonic acid, alpha chloro butyric acid, and the like and (2) the reaction product of a polyamine with an acid of at least twelve carbon atoms such as lauric, tridecylic, myristic, pentadecyclic, margaric, stearic, nondecylic, arachidic, oleic, linoleic, ricinoleic, palmitic, hydrogenated tallow fatty acids, napthenic, tall oil acids, abietic acid and the like. Moreover, an acid need not necessarily be used to prepare the partial amides used in this invention. We may also prepare partial amides from the following types of materials having the requisite number of carbon atoms: natural or hydrogenated glycerides such as cottonseed oil, acyl halides such as stearyl chloride, and similar materials.

A number of polyamines which we can use in the process of this invention are described in the U.S. patent and patent applications referred to earlier. In general, we can use polyamines containing two or more amino groups, such as, diethylene triamine, triethylene tetramine, tetraethylene pentamine, hexaethylene heptamine, etc., and derivatives of said polyamines having alkyl, hydroxy, alkoxy, etc. groups substituted for a hydrogen of an amino group thereof, such as 3-dimethyl amino propylamine and the like.

The partial amide salts are easily prepared by reacting the partial amides with an acid. Among the acids which can be used are acetic acid, propionic acid, hydrochloric acid, sulfuric acid, phosphoric acid, and the like.

However, this invention is not to be construed as limited to any particular mode of preparation of partial amides or their salts as the methods by which these are prepared are well known in the art. Neither is this invention to be construed as limited to the partial amides or their salts specifically disclosed here as other partial amides and partial amide salts can be used in this invention, and those listed above are presented merely for illustrative purposes only.

Generally speaking, the siliceous amino compounds contemplated in this invention can be prepared by reacting a water soluble silicate salt such as sodium silicates, potassium silicates, ammonium silicates, and the like with a mixture of partial amide salts as aforedescribed.

The ratio of short chain partial amides to long chain partial amides that we can use in the process of our invention will vary widely depending upon the use the siliceous amino compound will be put to.

When a siliceous amino compound with high oil thickening properties is desired, we can use from about one to three parts by weight of long chain partial amide for each part by weight, of a short chain partial amide. While these proportions may be varied, if a greater weight of the short chain partial amide than long chain partial amide is used, the oil thickening properties of the resultant siliceous amino compound would be diminished. If more than three parts by weight of a long chain partial amide is used, then the application of the freeze-thaw procedure, if used, will remove less water.

The amounts of short chain and long chain partial amides can vary more widely than indicated above where the siliceous amino compound is to be used for a purpose where high oil thickening properties are not necessary. For example, high oil thickening properties are not necessary when uses such as dry cleaning additives, flatting agents, fillers, insecticide carriers, etc., are contemplated. In such a case, we can use from about one part by weight of a short chain partial amide and nine parts by weight of a long chain partial amide to about nine parts by weight of a short chain partial amide and one part by weight of a long chain partial amide.

While the above is the basic reaction, conditions may be varied in that excess silicate salt can be used. When excess silicate is used which is subsequently converted with acid to silica, the resultant siliceous amino compound contains fine particles of silica and the siliceous amino compound is adsorbed or complexed upon the surface of the silica. For example, the excess silicate salt may be converted to a colloidal fine silica such as a silica gel or sol by treating the silicate salt with an acid such as sulfuric acid before the stoichiometric amount of the silicate is reacted with the mixture of partial amide salts. Alternatively, the mixture of partial amide salts may be reacted initially with an excess of the silicate salt and the excess silicate subsequently converted to silica, or, excess silicate may be converted to a fine colloidal silica and the mixture of partial amide salts may then be reacted initially with an excess of the silicate salt and the excess silicate subsequently converted to silica, or, excess silicate may be converted to a fine colloidal silica and the mixture of partial amide salts may then be reacted with additional excess silicate salt.

Additives, such as fluosilicic acid or a water soluble fluosilicate salt may also be added as described in U.S. application Serial No. 86,323, referred to above. Generally speaking, the fluosilicic acid or fluosilicate salt may be present at any stage of the preparation as long as it is present either before or during the formation of the siliceous amino compound. Among the water soluble fluosilicate salts which can be used are sodium fluosilicate, potassium fluosilicate, ammonium fluosilicate, magnesium fluosilicate, manganese fluosilicate, nickel fluosilicate, aluminum fluosilicate, rubidium fluosilicate, cesium fluosilicate, silver fluosilicate, cobaltous fluosilicate, thallium fluosilicate, zinc fluosilicate, cupric fluosilicate, lithium fluosilicate, hydrazine fluosilicate, hydroxylamine fluosilicate, amine fluosilicate and the like.

We can also use isophthalic acid, terephthalic acid or a water soluble salt thereof such as zinc terephthalate, magnesium terephthalate, zinc isophthalate, magnesium isophthalate, sodium terephthalate, potassium isophthalate, barium isophthalate and the like in preparing a siliceous amino compound as described in U.S. Serial No. 107,320 above. The isophthalic acid, terephthalic acid or water soluble salts thereof can be added at any time during the preparation and prior to the drying of the filter cake. If desired, isophthalic acid or terephthalic acid can be added in such a manner so that they remain part of the siliceous amino compound and are interspersed in and around the siliceous amino compound particles. This is done merely by precipitating isophthalic acid or terephthalic acid from its water soluble salt at any time before removing water from the reaction slurry containing the siliceous amino compound. In order to keep the isophthalic acid or terephthalic acid as a part of the composition of the siliceous amino compound, the slurry, before water is removed by filtering, centrifuging or the like, must be acid. If it is alkaline, then the isophthalic or terephthalic acid will be converted to its water soluble salt, and upon filtering and washing the filter cake, or upon removing water in any other manner such as centrifuging or the like, the water soluble salt will be substantially removed therefrom and a siliceous amino compound containing no isophthalic or terephthalic acid will have been prepared.

In all of the aforedescribed methods for preparing a siliceous amino compound, one or more water insoluble organic liquids as described in copending application Serial No. 836,086, filed August 26, 1959, may be used in preparing a siliceous amino compound. The water insoluble organic liquid, if used, must be present no later than when the siliceous amino compound is formed, if said liquid is to be of optimum value. Some of the water insoluble organic liquids which can be used are Varnish Makers' and Painters' Naphtha, xylene, n-butanol, capricaldehyde, benzene, vegetable and fish oils and the like more fully described in copending application Serial No. 836,086, filed August 25, 1959. The disclosure in Serial No. 836,086 is hereby incorporated into the present case by reference.

When the reaction is complete, i.e., when the siliceous amino compound is formed, the freeze-thaw procedure may be utilized to remove additional water. Although we prefer to use the freeze-thaw procedure, because even finer siliceous amino compound particles are thereby obtained, we will still obtain fine siliceous amino compound particles if we do not utilize the freeze-thaw procedure.

It is again important at this point to reiterate that the fine siliceous amino compound particles of this invention and the resultant improvement in solvent thickening power, are not obtained if any mixture of partial amides are used, but are only obtained if the mixture of partial amides conforms to the unique mixtures aforedescribed, i.e. a short chain partial amide prepared by reacting a polyamine and a four to five carbon organic acid as aforedescribed with a long chain partial amide prepared by reacting a polyamine and an organic acid of at least twelve carbon atoms.

Moreover, the freeze-thaw technique which heretofore has been advantageously used in connection only with siliceous amino compounds prepared from imidazoline and oxazoline salts can now be successfully used to remove additional water from siliceous amino compounds prepared from partial amide salts prepared from the unique mixtures of partial amides previously described.

If the freeze-thaw procedure is to be utilized, water may be initially removed in any manner which will assure the presence of the siliceous amino compound as a cake. Thus, we may initially remove water by filtering the reaction slurry, by centrifuging, by using a filter press and the like. Alternatively, water can be initially removed using any combination of water removal processes so long as a cake is obtained after the initial water removal. Thus, we can first drain off the water if two layers form, and then filter or centrifuge, etc. to initially remove water and obtain a cake.

When the reaction is complete and the siliceous amino compound is filtered or centrifuged, or the like, the cake is then frozen if it is desired to utilize the freeze-thaw procedure. The cake may be frozen in any type of convenient apparatus and the temperature employed is not critical except that the temperature must be sufficient to freeze the cake. The cake is kept in a frozen condition for as long as is desired before it is thawed out. The length of time that the cake is kept frozen is not critical, and the cake may even be thawed out immediately after it is frozen. When the cake is thawed out, any temperature up to and including the boiling point of the liquids present, in the apparatus employed, or of an azeotrope, if one is formed, can be used. We have found that by freezing the cake we may remove as much as 20% or more of the water remaining after the initial dewatering.

In the examples which follow, reference is made to the percent of water present in the cake. In determining the percent of water present, the basis used was the calculated total weight of the cake before freezing the cake and after the initial dewatering. All water percentages were determined on a calculated basis only, taking into consideration the calculated weight of all other materials present.

In the examples which follow, unless otherwise indicated, all filtrations were accomplished using a Büchner funnel. Unless otherwise indicated, the viscosity of all greases prepared was determined using a model HV–B Brookfield Viscosimeter.

In order to illustrate the nature of this invention and the manner of practicing the same, the following examples are presented.

EXAMPLE I

The purpose of this example is to illustrate the preparation of the siliceous amino compound using our unique mixture of partial amide salts as aforedescribed, a water insoluble volatile organic liquid, a water soluble fluosilicate salt, and isophthalic acid.

*(A) Preparation of the Silica Sol*

48 grams of a 40° Bé. sodium silicate ($Na_2O:3.22SiO_2$) solution was added to 10 grams of isophthalic acid dispersed in 800 cc. of water. The resultant suspension was mixed at room temperature until a clear sodium isophthalate-silica sol solution was obtained. 560 cc. of water was added thereto and the solution was heated to 80° C. with agitation. The solution was diluted with 400 milliliters of cold water and 9.6 grams of magnesium sulfate ($MgSO_4 \cdot 7H_2O$) dissolved in approximately 38 cc. of water at 40° C. was then added to the clear solution in order to form magnesium isophthalate. The resultant dispersion was cooled with agitation to 55° C. whereupon 5.0 grams of sodium fluosilicate was dissolved therein. The dispersion was allowed to cool to 40° C. with agitation.

95 grams of a 40° Bé. sodium silicate ($Na_2O:3.22SiO_2$) solution dissolved in 95 cc. of water, and 19 grams of 96% sulfuric acid which had been diluted with 172 cc. of water were added at the same time to the dispersion thereby forming silica sol. The addition of the two solutions was accomplished slowly, care being taken to keep the acid in excess at all times so that the slurry was at all times acid to Congo red paper. The silica sol was then heated with agitation to 55° C.

(B) *Preparation of the Partial Amide Salts*

7.5 grams of the monoamide of the hydrogenated tallow fatty acids and tetraethylene pentamine and 7.5 grams of the monoamide of butyric acid and diethylene triamide were dispersed in 200 grams of Varnish Makers' and Painters' Naphtha at a temperature of 70 to 75° C. A cloudy dispersion was obtained and 8.3 grams of glacial acetic acid was added to this dispersion to form the partial amide acetate salts. This salt dispersion was also cloudy.

(C) *Preparation of the Siliceous Amino Compound*

172 grams of a 40° Bé. sodium silicate ($Na_2O:3.22SiO_2$) solution diluted with 172 grams of water and the partial amide acetate salts dispersion were added at the same time to the silica sol of preparation A. During the addition, care was taken to keep the dispersion of the partial amide salts in excess at all times in order to minimize heavy gel formation. Approximately one-half of the sodium silicate dilution had been added when the entire dispersion of the amide salts was added. The addition of the sodium silicate dilution was continued until the remainder of the sodium silicate solution had been added. The slurry was heated during formation of the siliceous amino compound so that the temperature of the siliceous amino compound slurry was raised to 63° C. A sample of the slurry was taken and filtered. The filtrate had a pH of 9.7 and the pH of a subsequent filtrate, taken as before, was lowered to 4.7 by the addition of 180 cc. of a 10% sulfuric acid solution. This acid treatment precipitated most of the isophthalic acid in and around the siliceous amino compound particles.

(D) *Recovery of the Siliceous Amino Compound*

The cream yellow slurry was heated to 70° C. and filtered. The filter cake was washed and filtered four times, by each time agitating the filter cake with 1,000 cc. of water for 20 minutes at a temperature of 70° to 75° C. and filtering. The resultant filter cake had a water content of approximately 72%. The cake was frozen solid in a Dry Ice chest and was thawed out at a temperature from 80° to 85° C. Upon thawing the cake, a very viscous liquid slurry formed and the slurry was filtered so that the filter cake subsequently contained only approximately 58% water.

This filter cake was dried at a temperature of 170 to 180° F. Shrinkage during drying was approximately 10% thus indicating that very little agglomeration of the particles during drying had taken place. The product dried to a soft powdery cake which ground very easily to a fine powder.

A grease was prepared, using an Oster malt mixer, containing 13% by weight of the non-oil containing siliceous amino compound and 87% by weight of a 320 second Saybolt viscosity naphthenic base oil. This grease thickened to 90,800 centipoises as determined by a Brookfield HV-B model Viscosimeter.

EXAMPLE II

The purpose of this example is to illustrate that even though the freeze-thaw technique is not utilized in removing water, our unique mixture of partial amide salts produces siliceous amino compounds having superior oil thickening properties.

(A) *Preparation of the Silica Sol*

281.25 grams of a 40° Bé. sodium silicate ($Na_2O:3.22SiO_2$)

solution diluted with 281.25 cc. of water and 93 grams of 37.6% hydrochloric acid diluted with 186 cc. of water were added at the same time, with agitation, to 2,220 cc. of water. During the addition, care was taken to keep the acid in excess at all times so that the reaction always remained acid to Congo red paper. The clear silica sol was then digested for 22 hours at room temperature. The clear sol was then heated with agitation to a temperature of 75 to 80° C.

(B) *Preparation of the Partial Amide Salts*

A mixture of 12.5 grams of the monoamide of hydrogenated tallow fatty acids and aminoethylethanolamine and 6.25 grams of the monoamide of butyric acid and diethylene triamine were dispersed in 100 cc. of water at a temperature of 85° to 90° C.

6.25 grams of glacial acetic acid was then added to the dispersion in order to form the partial amide acetate salts. The dispersion was then diluted with 250 cc. of water and heated to a temperature of from 90 to 95° C.

(C) *Preparation of the Siliceous Amino Compound*

125 grams of a 320 second Saybolt viscosity naphthenic base oil was added to the silica sol of preparation A. A dilution of 100 grams of a 40° Bé. sodium silicate ($Na_2O:3.22SiO_2$) solution in 100 cc. of water, and the partial amide acetate salts of preparation B were slowly added at the same time to the silica sol of preparation A. During the addition, care was taken to keep the partial amide salts in excess at all times. The partial amide salts were added over a period of one-half hour and the sodium silicate solution over a period of one hour. A sample was taken from the resultant yellowish siliceous amino compound slurry and filtered. The filtrate from this sample had a pH of 7.85. Approximately 2 grams of 37.6% hydrochloric acid was added to the slurry and a sample taken as before and filtered. This second filtrate had a pH of 7.6. The entire slurry was agitated while allowing it to cool to 55° C. and then digested for 22 hours by allowing it to stand.

(D) *Recovery of the Siliceous Amino Compound*

The slurry was then heated with agitation to 70 to 75° C. and filtered. The filter cake was washed four times at a temperature of 70 to 75° C. by each time agitating the cake with 1500 cc. of water at a temperature of 70 to 75° C. for 20 minutes and then filtering. No attempt was made to remove additional water with the freeze-thaw technique.

A grease was prepared by simple mixing containing 25% by weight of the resultant product, half of which was oil, with 75% by weight of additional 320 second Saybolt viscosity naphthenic base oil. The grease thickened to 6,304 centipoises. When homogenized with a Manton-Gaulin homogenizer the grease thickened to 24,512 centipoises.

EXAMPLE III

The purpose of this example is to illustrate the use of different mixtures of the partial amide salts in preparing the siliceous amino compound according to this invention.

The procedure of Example II was repeated except that 12.5 grams of the monoamide of hydrogenated tallow fatty acids and diethylene triamine, 6.25 grams of the monoamide of butyric acid and diethylene triamine and 8.80 grams of glacial acetic acid were used. A grease containing 25% by weight of the resultant product, half of which was oil, and 75% of additional oil as in Example II, prepared as in Example II by simple mixing thickened to 6,816 centipoises and when homogenized as in Example II thickened to 22,720 centipoises.

EXAMPLE IV

The purpose of this example is to illustrate the degree of improvement in the oil thickening properties of a siliceous amino compound prepared by using the freeze-thaw technique as compared to a siliceous amino compound prepared in an identical manner but not utilizing the freeze-thaw technique.

(A) Preparation of Silica Sol 281.25 grams of a 40° Bé. sodium silicate $$(Na_2O:3.22SiO_2)$$

solution was diluted with 281 cc. of water. 93 grams of 37.1% hydrochloric acid was diluted with 186 cc. of water. The two solutions were slowly added at the same time to 2200 cc. of water. During the addition, the acid was kept in excess so that the slurry was at all times acid to Congo red paper, and the water was constantly agitated. The resultant clear silica sol was digested at room temperature for 23 hours and then heated with agitation to a temperature of from 75° to 80° C., whereupon 125 grams of a 320 second Saybolt viscosity naphthenic base oil was added thereto.

(B) Preparation of the Partial Amide Acetate Salts 12.5 grams of the monoamide of hydrogenated tallow fatty acids and aminoethylethanolamine and 6.25 grams of the monoamide of butyric acid and diethylenetriamine was dispersed in 100 cc. of water at a temperature of from 85° to 90° C. To this dispersion was then added 6.25 grams of glacial acetic acid. The resultant acetate salts dispersion was dissolved in 250 cc. of water at a temperature of from 90° to 95° C.

(C) Preparation of the Siliceous Amino Compound

The acetate salts solution and a dilution of 100 grams of a 40° Bé. sodium silicate solution (Na$_2$O:3.22SiO$_2$) diluted with 100 cc. of water were simultaneously added to the silica sol of preparation A, which was at a temperature of from 75° to 80° C. During the addition the silica sol was constantly agitated. The manner of addition was such that when all of the acetate salts solution was added, approximately one-half of the sodium silicate solution had been added. A sample of the resultant yellowish slurry was removed and filtered. The filtrate had a pH of 8.7, and 3 cc. of 37.1% hydrochloric acid was added to the slurry and a sample of the slurry removed and filtered as before. The pH of the second sample filtrate was 8.2. The slurry was agitated for one-half hour at a temperature of from 70° to 75° C. and was then digested by allowing it to cool and remain at room temperature.

(D) Recovery of the Siliceous Amino Compound

The digested slurry was heated with agitation at a temperature of from 75° to 80° C. and was filtered. The filter cake was washed four times. The washing was accomplished by adding approximately 1500 cc. of water, at a temperature of 70° to 75° C., for twenty minutes and agitating the slurry for twenty minutes and then filtering.

The filter cake was divided into two approximately equal portions.

(E) Treatment of Portion 1 of the Filter Cake

Portion 1 of the filter cake (approximately 716 grams) containing approximately 83% water, was dried at 150° to 155° F. This first portion was dried to a moisture content of 0.9%. Shrinkage during drying was approximately 40% by volume. Portion 1 dried to firm porous chunks and was ground in a Raymond laboratory hammer mill to 118 grams of a fine powder, 50% of which, by weight, was the oil added during the preparation.

(F) Treatment of Portion 2 of the Filter Cake

Portion 2 of the filter cake (approximately 720 grams) was frozen in a Dry Ice chest and then thawed using a boiling water bath. Upon thawing, a liquid phase separated and the thawed filter cake was again filtered to remove additional water. The second portion now had a water content of approximately 70%. Portion 2 was dried and ground in the manner of portion 1. Shrinkage during drying was approximately 11% by volume. The cake ground easily to 116 grams of a fine powder, 50% of which, by weight, was the oil added during the preparation.

(G) Comparison of the Oil Thickening Properties of Portion 1 With Portion 2

In order to compare the oil thickening properties of portion 1 with portion 2, greases of these portions were prepared by adding samples of each portion to 100 grams of a 320 second Saybolt viscosity naphthenic base oil. The greases were prepared by using an Oster malt mixer and mixing until a grease having a penetration value of between 330 and 350 was obtained. Results and concentrations are given in the table below.

TABLE I.—OIL THICKENING COMPARISON OF PORTION 1 WITH PORTION 2

| Portion | Concentration | | Viscosity (Centipoises) |
|---|---|---|---|
| | Percent by wt. of product in the grease | Percent by wt. of solids in the product | |
| 1 | 38.5 | 19.25 | 332,000 |
| 2 | 33.3 | 16.65 | 404,000 |

As can readily be seen from the above table, when the freeze-thaw technique is used, the oil thickening properties of the resultant siliceous amino compound is much improved when compared to a material which was not prepared utilizing the freeze-thaw technique. Particular attention is called to the fact that even though the grease prepared using portion 2 contained less solid material than the grease prepared using portion 1, portion 2 exhibited far superior oil thickening properties when compared to portion 1.

EXAMPLE V

The purpose of this example is to illustrate that siliceous amino compounds prepared using a mixture of long chain partial amide salts do not have as good oil thickening properties when compared to a siliceous amino compound prepared using a mixture of long chain partial amide salts and short chain partial amide salts. Another purpose is to illustrate that the freeze-thaw technique is not effective to separate additional water when a siliceous amino compound is prepared using only long chain partial amide salts.

The silica sol, partial amide salts, and siliceous amino compound were prepared in the manner of Example IV except that 18.75 grams of the monoamide of hydrogenated tallow fatty acids and aminoethylethanolamine was used in place of the monoamide used in Example IV. In addition, only 5.6 grams of glacial acetic acid was used in forming the partial amide acetate salts.

(A) Recovery of the Siliceous Amino Compound

A sample of the resultant siliceous amino compound slurry was removed and filtered. The filtrate had a pH of 8.1. The slurry was digested for 23 hours under room temperature conditions, filtered and washed as in Example IV. The wet filter cake was divided into two portions.

(B) Treatment of Portion 1

Portion 1 (742 grams containing approximately 82% water by weight) was washed, dried and ground as in Example IV. 50% of the product was the oil added during the preparation.

(C) Treatment of Portion 2

Portion 2 (approximately 600 grams containing 82% water by weight) was placed in a metal beaker and frozen in a Dry Ice chest. The frozen filter cake was then removed from the Dry Ice chest and thawed using a boiling water bath.

Unlike the treatment of portion 2 of Example IV, the freeze-thaw technique did not affect a liquification of the filter cake with separation of water therefrom, but instead, the filter cake had become a thin paste. For this reason, portion 2 will not be compared with either Example IV, or portion 1 of this example.

A grease prepared using portion 1 of this example and prepared in the manner of Example IV showed the following oil thickening properties.

| Portion | Concentration | | Viscosity (Centipoises) |
|---|---|---|---|
| | Percent by wt. of product in the grease | Percent by wt. of solids in the product | |
| 2 | 41.2 | 20.6 | 304,000 |

A comparison of this example with Example IV, demonstrates that when a mixture of short and long chain partial amide salts are used in preparing a siliceous amino compound, the resultant siliceous amino compound exhibits oil thickening properties which are superior to the oil thickening properties of the siliceous amino compounds prepared using only a mixture of long chain partial amide salts. Moreover, when a mixture of short and long chain partial amide salts and the freeze-thaw technique are used in preparing a siliceous amino compound, the resultant siliceous amino compound exhibits oil thickening properties which are superior to the oil-thickening properties of a siliceous amino compound prepared using a mixture of long chain partial amide salts, and are even superior to a siliceous amino compound prepared using a mixture of short and long chain partial amide salts, but not utilizing the freeze-thaw technique.

While this invention has been described in terms of certain prepared embodiments and illustrated by means of specific examples, these are illustrative only, and the invention is not to be construed as limited, except as set forth in the following claims.

What we claim as new and desire to secure by Letters Patent is:

1. In a process for preparing siliceous amino compounds by reacting partial amide salts with at least stoichiometric amounts of at least one water-soluble silicate salt selected from the class consisting of potassium silicates, ammonium silicates and sodium silicates and thereafter removing water from the resulting slurry, the improvement comprising utilizing as said partial amide salts, a mixture of salts of short chain partial amides and long chain partial amides, said short chain partial amide prepared by reacting a polyamine with a material selected from the group consisting of aliphatic monocarboxylic acids, acyl halides and glycerides containing the radical RCO—, said R representing a carbon chain length of from 3 to 4 carbon atoms and said long chain partial amide prepared by reacting a polyamine with a material selected from the group consisting of aliphatic monocarboxylic acids, acyl halides and glycerides containing the radical RCO—, said R representing a carbon chain length of at least 11 carbon atoms, said mixture of salts of short chain partial amide and long chain partial amide being formed from a mixture of from about one to nine parts by weight of said short chain partial amide to about nine to one part by weight of said long chain partial amide.

2. A process according to claim 1 wherein said mixture of partial amide salts are formed from a mixture of about equal weights of said short chain partial amide and said long chain partial amide.

3. A process according to claim 1, including the steps of separating water from said resultant slurry to obtain a solid cake, freezing said cake, thawing said frozen cake, and filtering to remove additional water from said cake.

4. A process according to claim 1, wherein said mixture of partial amide salts is reacted with said water soluble silicate salt in the presence of a material selected from the class consisting of fluosilicic acid and water soluble fluosilicate salts.

5. A process according to claim 1, wherein an aromatic compound selected from the class consisting of isophthalic acid, terephthalic acid and water soluble salts thereof is present before said water is removed from said resultant slurry.

6. A process according to claim 1, wherein a water insoluble organic compound is present, said compound being a liquid at the operating tempeature of said process.

7. A process according to claim 1, wherein said mixture of partial amide salts is reacted with more than a stoichiometric amount of said water soluble silicate salt.

8. A process according to claim 1, wherein said mixture is the partial amide acetate salts of (1) the monoamide of hydrogenated tallow fatty acids and tetraethylene pentamine and (2) the monoamide of butyric acid and diethylene triamine.

9. A process according to claim 1, wherein said mixture is the partial amide acetate salts of (1) the monoamide of hydrogenated tallow fatty acids and aminoethylethanolamine and (2) the monoamide of butyric acid and diethylene triamine.

10. A process according to claim 1, wherein said mixture is the partial amide acetate salts of (1) the monoamide of hydrogenated tallow fatty acids and diethylene triamine and (2) the monoamide of butyric acid and diethylene triamine.

11. A process according to claim 1, wherein the reaction of said mixture of partial amide salts with said water soluble silicate salt is carried out in the presence of colloidal silica.

12. A process according to claim 11, wherein said mixture of partial amide salts is reacted with said water soluble silicate salt in the presence of a material selected from the class consisting of fluosilicic acid and water soluble fluosilicate salts.

13. A process according to claim 11, wherein an aromatic compound selected from the class consisting of isophthalic acid, terephthalic acid and water soluble salts thereof is present before said water is removed from said resultant slurry.

14. A process according to claim 11, wherein a water insoluble organic compound is present, said compound being a liquid at the operating temperature of the process.

References Cited in the file of this patent

UNITED STATES PATENTS 2,967,828  Ihde _____ Jan. 10, 1961